United States Patent [19]

Kacirek

[11] 4,270,879

[45] Jun. 2, 1981

[54] SHEET STACKING APPARATUS

[75] Inventor: Kenneth J. Kacirek, Fresno, Calif.

[73] Assignee: PPG Industries, Inc., Pittsburgh, Pa.

[21] Appl. No.: 39,064

[22] Filed: May 11, 1979

[51] Int. Cl.³ ............... B65H 29/32; B65H 29/46; B65H 31/10; B65H 31/22

[52] U.S. Cl. .................... 414/35; 271/176; 271/180; 271/197; 271/203; 271/251; 414/38; 414/73; 414/786

[58] Field of Search ............ 271/180, 197, 202, 203, 271/200, 251, 217, 195, 198, 199, 176, 196, 194, 193; 414/73, 75, 69, 72, 74, 38, 786, 35, 36

[56] References Cited

U.S. PATENT DOCUMENTS

| | | | |
|---|---|---|---|
| 1,128,671 | 2/1915 | Evans | 414/38 |
| 2,960,242 | 11/1960 | Herr et al. | 414/74 X |
| 3,008,747 | 11/1961 | Lytle . | |
| 3,272,351 | 9/1966 | Burton et al. | 271/197 X |
| 3,305,233 | 2/1967 | Cody | 271/180 |
| 3,377,223 | 4/1968 | Clausen et al. . | |
| 3,395,915 | 8/1968 | Clausen et al. . | |
| 3,431,010 | 3/1969 | Glanemann . | |
| 3,445,313 | 5/1969 | Clausen et al. . | |
| 3,476,241 | 11/1969 | Ungerer | 271/197 X |
| 3,480,160 | 11/1969 | Barradell-Smith et al. . | |
| 3,820,779 | 6/1974 | Bishop | 271/180 |
| 3,880,297 | 4/1975 | Martin | 271/195 X |
| 3,907,127 | 9/1975 | Bollinger et al. . | |
| 3,970,341 | 7/1976 | Glanemann et al. . | |
| 4,111,412 | 9/1978 | Cathers | 271/251 |

OTHER PUBLICATIONS

1968 Brochure of Lear Siegler, Inc. "Vacuum Belt Feeder/Stacker".

Primary Examiner—Bruce H. Stoner, Jr.
Attorney, Agent, or Firm—Donald Carl Lepiane

[57] ABSTRACT

A sheet stacking device includes a plurality of endless belts spaced from one another and rotating at a predetermined speed toward a sheet shipping container mounted at a loading position. A sheet held against the belt by vacuum pulled between the belts moves along a movement path into a wall of the container. The belts continue to rotate to align the sheet relative to the container; afterward plungers move the sheet downward away from the belts onto the backwall of the container to stack same.

11 Claims, 5 Drawing Figures

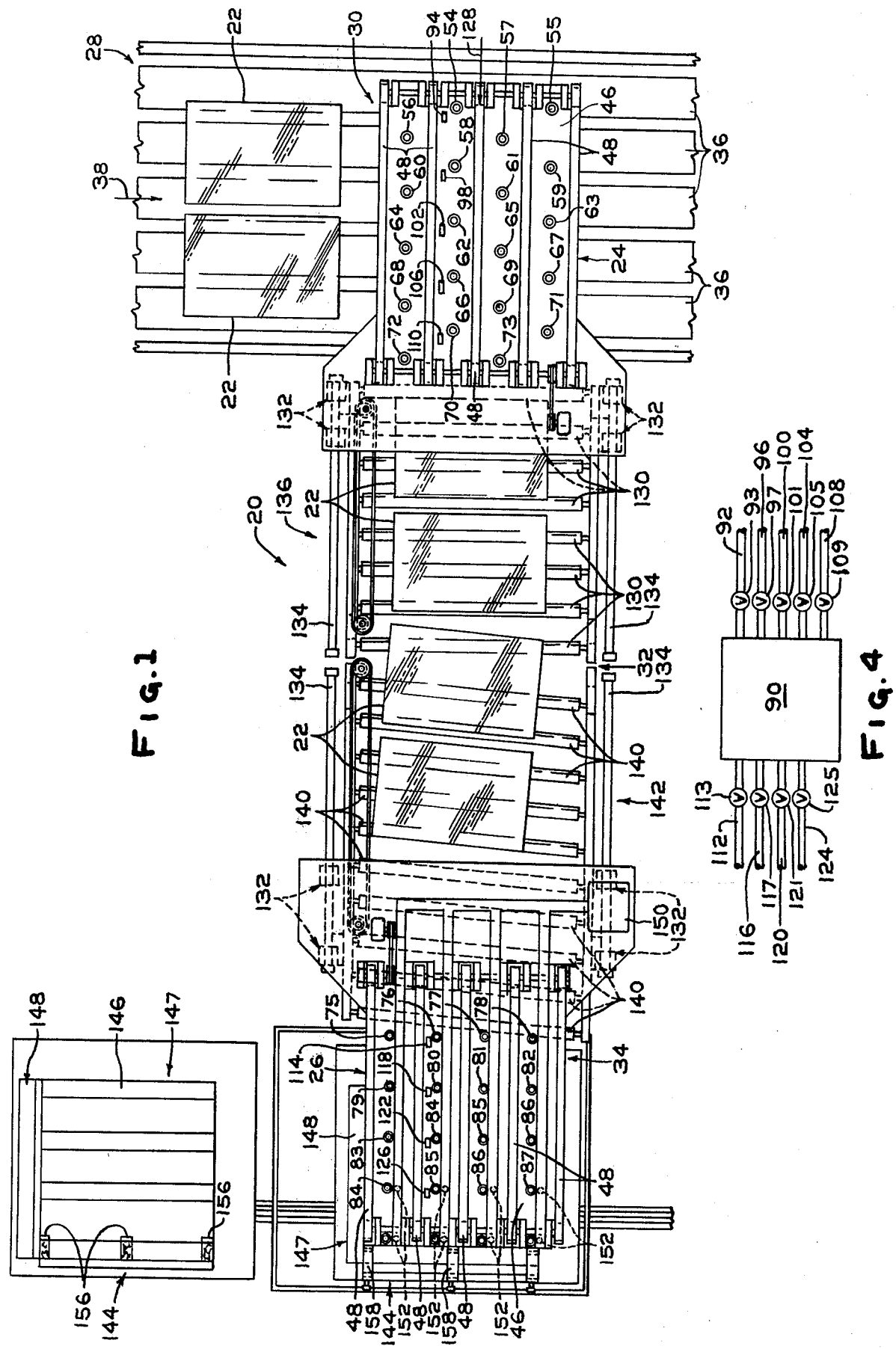

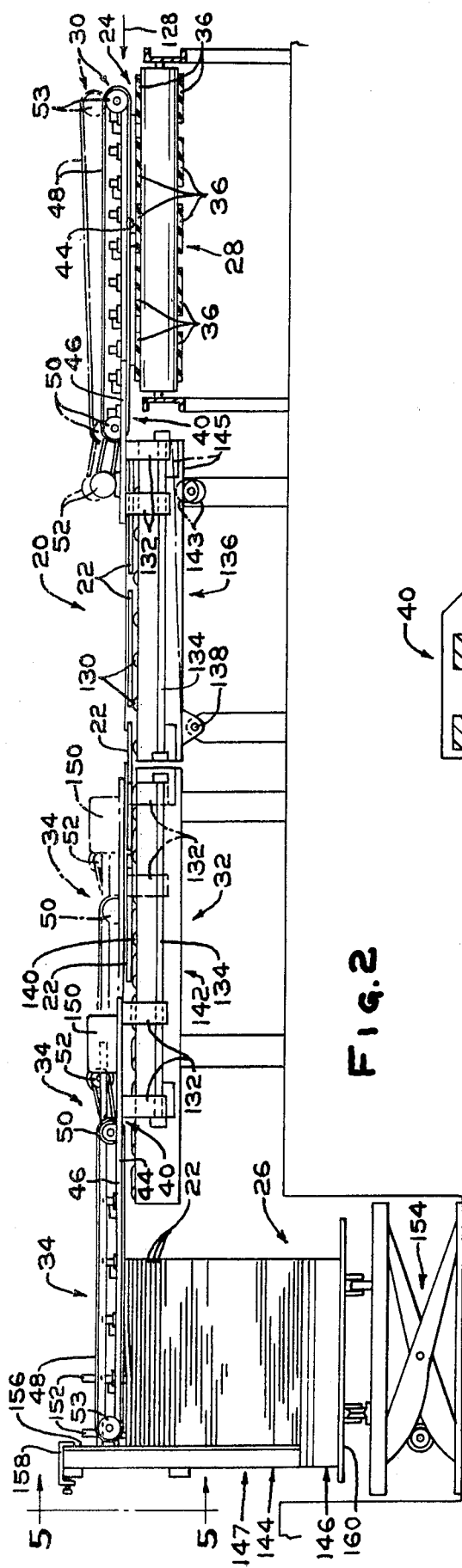
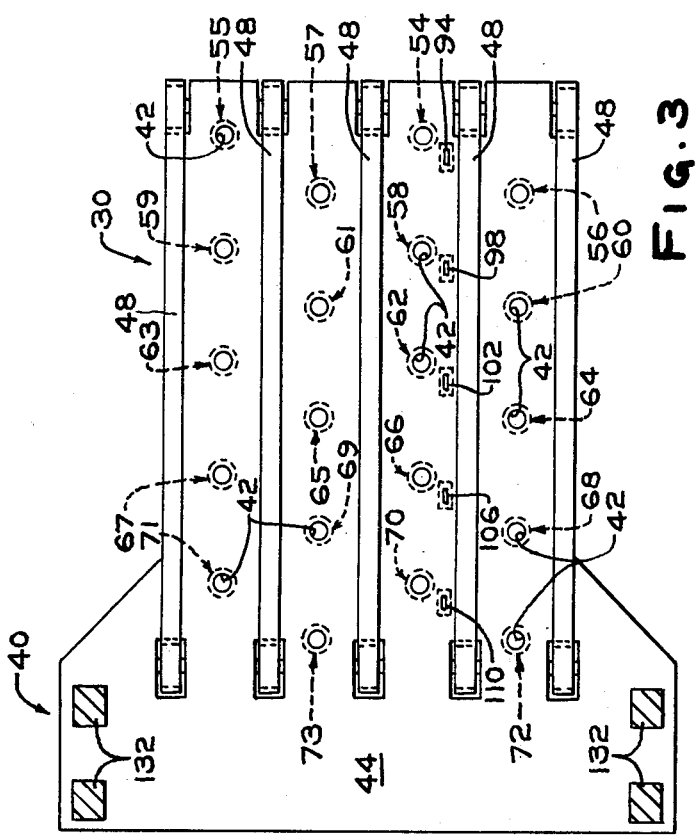
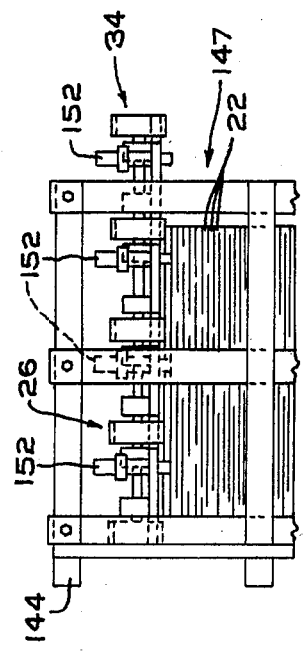

SHEET STACKING APPARATUS

BACKGROUND OF THE INVENTION

1. Field of the Invention

The invention relates to a method of and apparatus for handling articles and, more particularly, stacking glass sheets.

2. Discussion of the Prior Art and Technical Problems

The prior art teaches various techniques and equipment for handling articles e.g. sheets. Typical article handling and stacking apparatuses are taught in

| U.S. Pat. Nos. | U.S. Pat. Nos. |
|---|---|
| 3,008,747 | 3,445,313 |
| 3,377,223 | 3,480,160 |
| 3,395,915 | 3,907,127 |
| 3,431,010 | 3,970,341 |

In general, U.S. Pat. Nos. 3,008,747; 3,431,010 and 3,970,341 teach pulling a vacuum through cups and/or cylinders to secure sheet thereto. The drawback with using vacuum cups and/or cylinders of the type taught in the above-mentioned patents for handling or stacking sheets is that the procedure is slow because only one sheet can be handled at a time.

U.S. Pat. Nos. 3,377,223; 3,445,313; 3,480,160; and 3,907,127 teach vacuum conveyors for handling and/or stacking sheets. In general, a vacuum is pulled through an endless porous belt to maintain the sheet against the belt. As the belt moves, the sheet is displaced along a sheet movement path toward a release or stacking position. When the sheet is in a predetermined position relative to the release position the vacuum is broken to release the sheet either by urging the sheet away from the belt or shutting off the vacuum. A limitation with the above type apparatuses is that the sheet must be released from the belt when the sheet is in the predetermined release position. For example, when the sheet is released from the belt and moves along a trajectory path into the stacking position, a quick release can result in the sheet falling short of the stacking position and a late release can result in the sheet passing over the stacking position. When the stacking apparatus is of the type having the leading edge of the sheet moving into a stop and thereafter the sheet is released, a late release can damage the sheet because the belt urges the sheet forward but the stop prevents movement of the sheet. An additional problem with a late release is that the belt moves over the surface of the stationary sheet marring same. An early release can result in a non-uniform sheet stack which is difficult to secure for handling.

U.S. Pat. No. 3,395,915 teaches a sheet handling device having a plurality of spaced moving belts moving over a perforated plate. A vacuum is pulled through the plate between the belts to urge the sheet against the moving belts. Although the apparatus eliminates the problem of marring the sheet surface when the sheet engages a stop, there are no provisions for providing a uniform stack of sheets. For example, as the sheet is released, an air cushion between the recently released sheet and stack allows the sheet to freely move sideways, forward and backwards resulting in a non-uniform stack. Providing aligning members to align the stacked sheet e.g. as taught in U.S. Pat. No. 3,907,127 compensates for but does not solve the non-alignment problem.

It would be advantageous therefore to provide a method of and apparatus for handling and stacking sheets that does not have the drawback of the prior art.

SUMMARY OF THE INVENTION

This invention relates to an apparatus for handling an article, e.g. for stacking a glass sheet. At least one belt moves along an article movement path, e.g. between a pick up station and a stacking position. First urging or biasing facilities, e.g. a vacuum pulled adjacent a side of the belt maintains the sheet against the belts. As the sheet advances toward a stop member e.g. engages the stop member, second biasing facilities move the sheet away from the at least one belt. In an embodiment of the invention a vacuum is pulled between a plurality of spaced belts to maintain the sheet against the belts.

This invention also relates to a method of handling the article, e.g. stacking the sheet. A vacuum is pulled between spaced belts to urge the sheet against the belts as the belts move the sheets along a movement path toward a stop member. When the leading edge of the sheet is in a predetermined position relative to a stop member e.g. the sheet engages the stop membrane, the sheet is biased away from the moving belts.

BRIEF DESCRIPTION OF THE DRAWING

FIG. 1 is a plan view of a stacking and/or sheet handling apparatus incorporating features of the invention;

FIG. 2 is a side elevated view of the apparatus shown in FIG. 1;

FIG. 3 is a view of the bottom surface of a transfer conveyor of the apparatus shown in FIGS. 1 and 2;

FIG. 4 is a schematic of an air supply and conduits to supply air to vacuum devices of the transfer and stacking conveyors; and FIG. 5 is a view taken along lines 5—5 of FIG. 2.

DETAILED DESCRIPTION OF THE INVENTION

Shown in FIG. 1 is a handling or transfer and/or stacking system 20 which is used to pick up an article e.g. a sheet or sheets 22 at a pick up position 24, align the sheet and thereafter sequentially stack the sheets at an unload station 26. In general, a conveyor 28 moves the sheets 22 into the pickup position 24 located under an overhead transfer conveyor 30. The conveyor 30 transfers the sheet 22 onto an alignment conveyor 32 to align the sheet and move same under a transfer and stacking conveyor 34 which sequentially moves the sheets from the alignment conveyor 32 to the unload station 26 where individual sheets are removed from the conveyor 32 and stacked in a manner to be discussed below.

The conveyor 28 and pick up position 24 are not limiting to the invention and any arrangement for positioning a sheet or sheets 22 under the transfer conveyor 30 may be used in the practice of the invention. For example, and as shown in FIGS. 1 and 2, the transfer conveyor 28 may include a plurality of spaced endless belts 36 for conveying a sheet or sheets 22 in the direction of the arrow 38 as shown in FIG. 1 into the pick up position 24. As the sheets 22 move along the conveyor 28 visual inspection may be made to determine whether or not the sheets are usable or acceptable. If the sheet is acceptable, the conveyor 28 is deenergized in any convenient manner to stop the sheets in the unload position 24 under the overhead transfer conveyor 30. If only one sheet is acceptable, the sheets are stopped in the unload position and the acceptable sheet is picked up by the transfer device 30. Thereafter the conveyor 28 is energized to move the unacceptable sheet away from the pick up station 24. If both sheets are unacceptable, the conveyor 28 moves them beyond the pick up station 24.

In the following discussion the overhead transfer conveyor 30 and transfer and stacking conveyor 34 are similar in construction; however, as will be appreciated, the construction of the overhead transfer conveyor 30 is not limiting to the invention. The following discussion will be specifically directed to the overhead transfer conveyor 30 which discussion is applicable to the transfer and stacking conveyor 34 as shown by the use of like numerals.

With reference to FIGS. 1, 2 and 3, the conveyor 30 includes a rigid plate 40 having a plurality of holes 42 (shown only in FIG. 3) providing communication between the bottom surface 44 (see FIG. 2) and the upper surface 46 (see also FIG. 1) through which a vacuum is pulled in any convenient manner. A plurality of spaced belts 48 have their path defined by power rollers 50 driven by motor 52 and idler rollers 53 (clearly shown in FIG. 2) and move over the bottom surface 44 of the plate 40 of the conveyors 30 and 34. The vacuum, e.g. pulled by air amplifiers 56–73 for conveyor 30 and air amplifiers 75–87 for conveyor 34 (numbered only in FIGS. 1 & 3) of the type sold by Vortex Corporation of Cincinnati, Ohio, Model No. 913 urges and maintains the sheets 22 against the belts 48. The air supply 90 shown in FIG. 4 is connected to selected air amplifiers through conduits and normally closed solenoids which are actuated in any convenient manner. For example and with reference to FIGS. 1 and 4 for the conveyor 30, the air amplifiers 54–55 are connected to the air supply 90 by conduit 92 and solenoid 93 in the conduit 92 is operated by microswitch 94; the air amplifiers 56–59 are connected to the air supply 90 by conduit 96 and solenoid 97 in the conduit 96 is operated by microswitch 98; the air amplifiers 60–63 are connected to the air supply 90 by conduit 100 and solenoid 101 in the conduit 100 is operated by microswitch 102; the air amplifiers 64–67 are connected to the air supply 90 by conduit 104 and solenoid 105 in the conduit 104 is operated by microswitch 106; and the air amplifiers 68–73 are connected to the air supply 90 by conduit 108 and solenoid 109 in the conduit 108 is operated by microswitch 110.

For the transfer and stacking conveyor 34 the air amplifiers 75–78 are connected to the air supply 90 by conduit 112 and solenoid 113 in the conduit 112 is operated by microswitch 114; the air amplifiers 79–82 are connected to the air supply 90 by conduit 116 and solenoid 117 in the conduit 116 is operated by microswitch 118; the air amplifiers 83–86 are connected to the air supply 90 by conduit 120 and solenoid 121 in the conduit 121 is operated by microswitch 122; and the air amplifiers 84–87 are connected to the air supply 90 by conduit 124 and solenoid 125 in the conduit 124 is operated by microswitch 126. The microswitches 94, 98, 102, 106 and 126 of the conveyor 34 and microswitches 114, 118, 122 and 126 of the conveyor 34 are in the path of the glass so that the glass contacting the microswitch opens their respective normally closed solenoid. For example, a pair of acceptable glass sheets 22 move along the conveyor 28 into the pick up position 24 at which time the conveyor 28 is preferably stopped. Either manually or automatically selected ones or all of the normally closed solenoids 93, 97, 101, 105 and 109 are conveniently opened. Air moves through the amplifier 54–73 to pull a vacuum through their respective hole 42 and between the belts to urge the sheets against the belts and respective overhead microswitches. The solenoids having their respective microswitches contacted by the glass sheets remain open and the solenoids whose respective microswitches are not contacted by the glass sheets close. The motor 52 which may be energized during the pick up of the sheets or after the sheets are picked up rotates the belts 48 of the conveyor 30 to move the sheets in the direction of the arrow 128 shown in FIGS. 1 and 2 to move the sheets toward the alignment conveyor 32. As the leading edge of the sheets contacts a microswitch its respective normally closed solenoid opens to move air through its respective amplifiers to pull a vacuum on the moving sheets. As the trailing edge of the sheets disengages a microswitch its respective open solenoid closes to deactivate its respective amplifiers. As the sheets advance along the path 128 they move onto the alignment conveyor 32. The feature of opening and closing the microswitch to open and close their respective solenoids is not limiting to the invention but is shown as an energy saving expediency.

Preferably the sheet displacement speed of the belts 48 of the conveyor 30 and of the alignment conveyor 32 are approximately the same to prevent marring of the sheets as they leave the conveyor 20 and move onto the conveyor 32. Further, the spaced distance between the belts 48 and rolls 130 of the conveyor 32 is minimal to allow the sheet to freely move onto the conveyor 130 while minimizing the drop distance of the sheet onto the rolls 130. The distance between the belts 36 and 48 of the conveyors 28 and 30, respectively, at the pick up station 24 is not limiting to the invention, however, the spaced distance should be small enough to pull the sheet upward when the vacuum is applied and large enough to freely move the sheets into the pick up station 24.

Although not limiting to the invention but recommended to prevent damage to the belts 48 of the conveyor 30 from broken upward extending glass and to remove the conveyor 30 from over the conveyor 28 when the conveyor 30 is not in use or needs repair, the conveyor 30 is conveniently mounted for vertical and horizontal movement. For example and with reference to FIGS. 1 and 2, a pair of bosses 132 mounted on each side of the plate 40 on its bottom surface 44 have bearings (not shown) which ride on a guiderail 134. Urging the conveyor 30 to the left as viewed in FIG. 1 moves the conveyor 30 over the rolls 130 of the alignment conveyor 32 and urging the conveyor 30 to the right as viewed in FIG. 2 moves the conveyor 30 over the pickup position 24. With reference to FIG. 2, section 136 of the conveyor 32 having the rolls 130 is pivotally mounted at 138 and acted on by cam 143 at 145. Raising the section 136 by the cam 143 displaces the conveyor 30 upward as viewed in FIG. 2 from a pick up or engaging position to pick up the glass sheets to a non-engaging position to pass unacceptable sheets along the conveyor 28 through the pick up position 24.

The sheets 22 move along the rolls 130 onto skewed rolls 140 of section 142 of the conveyor 32 to align the sheets in a similar manner as taught in U.S. Pat. No. 4,111,412 which teachings are hereby incorporated by reference. The sheets 22 are aligned so that the transfer conveyor 34 receives individual sheets from the conveyor 32 at the same location which assists in aligning the sides of the stacked sheets. The aligned sheets on skewed rolls 140 of the section 142 of the conveyor 32 move under the transfer conveyor 34. When the leading edge of the sheet engages the microswitch 114, the normally closed solenoid 113 opens and vacuum is pulled through the amplifiers 75-78 to urge the sheet against the moving belts 48 of the conveyor 34. Continual movement of the belts 48 and rollers 140 moves the sheet in the direction of the arrow 128 off the rolls 140 of the conveyor 32. As the leading edge engages a microswitch; the normally closed solenoid associated with the microswitch opens and a vacuum is pulled through the amplifiers associated with the solenoid. When the trailing edge of the sheet disengages a microswitch the solenoid associated with the microswitch closes to discontinue air flow through the amplifiers.

The sheets move in the direction of the arrow 128 into a stop member which in the following discussion is a sidewall 144 of a case, container or rack 147 positioned at the unload station 26. The type of rack 147 used is not limiting to the invention and may be any of the types known in the art. In the practice of the invention, backwall 146 of the container 147 in its uprighted position acts as the receiving surface for the sheets during stacking and base 148 of the container 142 in its uprighted position acts as a sidewall to prevent lateral displacement of the sheets during stacking.

With reference to FIGS. 1, 2 and 5, when the leading edge of the sheet engages or prior to engaging the sidewall 144 of the rack 147, the last microswitch e.g. microswitch 126 is engaged to open the normally closed solenoid 125 to pull a vacuum through holes in the plate by the air amplifiers 84-87 and piston control 150 is actuated. After a predetermined time period pistons 152 move downward as viewed in FIGS. 2 and 5 to move the sheet away from the belts. The time delay in actuating the pistons 152 is not limiting to the invention, however it is recommended that the pistons 152 not be actuated until the leading edge of the sheet contacts the container sidewall 144 to align the leading edge of the stacked sheets. For example, sheets moving at a speed of about 25 inches per second (0.6 meters per second) with the microswitch 126 spaced about 10 inches (25.4 centimeters) from the container sidewall 144, a delay time between contacting the microswitch 126 and actuating the plungers 152 of 0.5 second permits alignment of the leading edge of the sheet with the container sidewall 144.

The forward motion of the sheet is stopped by the container sidewall 144 as the motion of the belts 48 continuously urge the leading edge of the sheet against the container sidewall. The surface of the sheet contacting the belts and the leading edge of the sheet urged against the container sidewall are not damaged because the vacuum applied to the sheet is between the belts and not through the belts. In this manner, the belts can continue to rotate to urge the leading edge of the sheet against the container without damaging the sheet.

When the plungers 152 are actuated they move downward as viewed in FIG. 5 to urge the leading portions of the sheet downward away from the belts onto a receiving surface which is either the container backwall 146 or a previously stacked sheet. As the leading portion of the sheet moves downward the sheet disengages the microswitch 126 which closes its respective open solenoid 125. Residual air in the line 124 continues to pull a vacuum on the sheet after the solenoid closes but the sheet is urged downward by the force of the plunger 152. When the sheet contacts the receiving surface, the opposing force of the stacked sheet is sufficient to prevent further downward motion of the plungers 152. The sheet as it sequentially disengages the upstream microswitch drops downward and the air between the receiving surface and sheet being stacked is moved outward thereof. Horizontal motion of the sheet is prevented by the plungers holding leading portions of the sheet on the stacked surface. After a predetermined time period, e.g about one second the plungers move upward until actuated by the next sheet. After a predetermined number of sheets, e.g. 5 sheets are stacked, elevator 154 indexes downward as viewed in FIG. 2 to receive the next group of sheets. To prevent damage to the leading edge of the sheet as it moves downward, low friction fiberboard strips 156 are used and may be held in position by clamps 158 as shown in FIG. 2.

The conveyors 28, 30, 32 and 34 may be operated at various speeds to reduce the time required to move the sheets from the pick up position to the unload position and thereafter decrease the speed of the sheets as the leading edge of the sheet moves against the sidewall 144 of the rack 147. In this manner sufficient time to stack the sheets is provided and/or damage to the leading edge of sheet is minimized as it engages the sidewall 144. For example, the sheets may be moved at a speed of about 25 inches per second (0.6 meters per second) toward the microswitch 126 of the conveyor 32, i.e. the microswitch immediately upstream of the sidewall 144 of the rack 147. In addition to the previously discussed occurrences when the microswitch 126 is engaged, the conveyors 28, 30, 32 and 34 slow down to a speed of about 10 inches per second (25.4 centimeters per second). When the plungers 152 disengage the stacked sheet and move upward the speed of the conveyors 28, 30, 32 and 34 increases to 25 inches per second (0.6 meters per second).

After the rack 147 is loaded, the conveyor 34 is moved along the guiderails 134 over the skewed rolls 140. The loaded rack is raised upward by the elevator 154 and platform 160 rolled off the elevator as an empty rack is moved thereon. The conveyor 34 is moved over the receiving surface i.e. container backwall 146 and the empty rack is loaded as previously described. The stacked sheets are secured in the loaded container and the rack uprighted in any conventional manner.

As can be appreciated, modifications may be made to the handling and stacking system of the instant invention without deviating from the scope thereof. For example, the invention is not limited to glass sheets and may be practiced on wooden, metal and/or plastic sheets. In addition, the invention may be practiced by using one belt and applying a vacuum on each side of the belt to maintain the sheet against the belt. In the alternative, a belt and a stationary low friction strip, e.g. a strip made of synthetic resin polymers sold under the trademark TEFLON may be used. When the latter is used, vacuum is applied between the belt and strip to urge the sheet against the belt and strip. Movement of the belt advances the sheet on strip along the movement path. Further, examples present in the above discussion are for illustration purposes only and are not limiting to the invention.

What is claimed is:
1. Apparatus for stacking sheets, comprising:
a stacking position;

a porous plate member having a major surface with a portion of the major surface of said plate member over said stacking position;

a pair of spaced belts;

means for moving said pair of spaced belts over the major surface of said plate member along a sheet movement path;

stop means mounted in the movement path adjacent said stacking position;

means for applying a vacuum at least between said pair of spaced belts to bias a sheet to be stacked against said belts;

means mounted upstream of said stop means for biasing portions of the sheet away from said belts;

means for actuating said biasing means;

means responsive to the movement of the sheet for energizing said actuating means, said actuating means including a time delay such that operation of said means responsive to the movement of the sheet causes said actuating means to actuate said biasing means a predetermined time period after the sheet engages said stop means; and means responsive to the sheet moving away from said belts for deactivating said vacuum means.

2. The apparatus as set forth in claim 1 wherein said means for applying a vacuum includes:

a plurality of discrete vacuum devices.

3. The apparatus as set forth in claim 2 wherein said biasing means includes at least one plunger having reciprocating movement toward and away from the movement path.

4. The apparatus as set forth in claim 1 wherein said moving means moves said belts at varying speeds in response to said energizing means.

5. The apparatus as set forth in claim 4 wherein the sheets are glass sheets and said stop means is a sidewall of a container and further including:

means for moving the container toward and away from said belts.

6. The apparatus as set forth in claim 5 further comprising:

means for advancing the sheet along a horizontal path into a pick up station;

means for aligning the sheet;

means for transferring the sheet from the pickup station to said aligning means; and means for moving the sheet from said aligning means to a position below said plurality of belts and for activating said means for applying a vacuum.

7. The apparatus as set forth in claim 4 wherein said stacking position includes a receiving surface lying in a generally horizontal plane and the movement path is generally parallel to the receiving surface, and further including:

means for moving said belts and said plate member along a reciprocating horizontal movement path toward and away from said stacking position.

8. A method of stacking sheets, comprising the steps of:

applying a vacuum between a pair of spaced belts to maintain the sheet against the belts;

moving the belts along a movement path to move a sheet along the movement path toward stop means positioned adjacent a stacking position;

urging leading edge of the sheet against the stop means as the belts continue to move to align the sheet relative to the stacking position;

a predetermined time period after practicing said urging step biasing portions of the sheet away from the belts toward the stacking position; and thereafter discontinuing said applying step.

9. The method as set forth in claim 8 wherein the belts are moved at a first speed and further including the step of:

moving the belts at a slower second speed when the sheet and stop means contact one another.

10. The method as set forth in claim 9 wherein the sheets are glass sheets, the stop means is a sidewall of a container and the sheets are stacked on the backwall of the container and further including the step of:

displacing the container away from the belts after a predetermined number of sheets are stacked on the backwall of the container.

11. The method as set forth in claim 10 further including the steps of:

removing the container after a predetermined number of sheets are stacked in the container;

securing the sheets in the container; and uprighting the container.

* * * * *